United States Patent
Wang et al.

(10) Patent No.: US 11,326,042 B1
(45) Date of Patent: May 10, 2022

(54) FOUNDRY DUST COMPOUND REINFORCING FILLER FOR NATURAL RUBBER AND METHOD FOR MAKING SAME

(71) Applicant: JIANGSU UNIVERSITY OF TECHNOLOGY, Changzhou (CN)

(72) Inventors: Fajun Wang, Changzhou (CN); Sheng Lei, Changzhou (CN); Junfei Ou, Changzhou (CN); Wen Li, Changzhou (CN)

(73) Assignee: JIANGSU UNIVERSITY OF TECHNOLOGY, Changzhou (CN)

( * ) Notice: Subject to any disclaimer, the term of this patent is extended or adjusted under 35 U.S.C. 154(b) by 0 days.

(21) Appl. No.: 17/502,034

(22) Filed: Oct. 14, 2021

(30) Foreign Application Priority Data

Nov. 9, 2020 (CN) .......................... 202011236162.7

(51) Int. Cl.
| | |
|---|---|
| *C08K 13/06* | (2006.01) |
| *C08K 11/00* | (2006.01) |
| *C09C 3/12* | (2006.01) |
| *C09C 3/04* | (2006.01) |
| *C09C 3/00* | (2006.01) |
| *C09C 1/00* | (2006.01) |
| *B02C 21/00* | (2006.01) |

(52) U.S. Cl.
CPC .............. *C08K 11/005* (2013.01); *B02C 21/00* (2013.01); *C09C 1/0081* (2013.01); *C09C 3/006* (2013.01); *C09C 3/041* (2013.01); *C09C 3/045* (2013.01); *C09C 3/12* (2013.01); *C01P 2004/03* (2013.01)

(58) Field of Classification Search
CPC ..... C08K 11/005; B02C 21/00; C09C 1/0081; C09C 3/006; C09C 3/041; C09C 3/045; C09C 3/12; C01P 2004/03
See application file for complete search history.

(56) References Cited

FOREIGN PATENT DOCUMENTS

| CN | 107011549 B | * | 8/2018 | |
|---|---|---|---|---|
| CN | 111662484 A | | 9/2020 | |
| EP | 3093082 B1 | * | 10/2018 | ............... B22C 5/18 |

OTHER PUBLICATIONS

First Office Action from China Patent Office in a counterpart Chinese Patent Application 2020112361627, dated May 19, 2021.
Decision to grant patent from China patent office in a counterpart Chinese patent Application 2020112361627, dated Jul. 21, 2021.

* cited by examiner

*Primary Examiner* — Shuangyi Abu Ali

(57) ABSTRACT

A foundry dust compound reinforcing filler for natural rubber contains 40-80 parts by weight of foundry dust, 10-40 parts by weight of silica and 10-40 parts by weight of Carbon black. A method for preparing a foundry dust compound reinforcing filler for natural rubber includes the steps of sieving, iron removal, pickling, precipitation, primary grinding, mixing, secondary grinding, granulation and the like. The foundry dust compound reinforcing filler used for reinforcing natural rubber is easy to disperse in natural rubber. The compound reinforcing filler has excellent reinforcing effect, which realizes the resource utilization of casting dust waste and reduces the consumption of silica and carbon black.

1 Claim, 2 Drawing Sheets

| Recipe | Tensile strength/ MPa | Elongation at break/% | Shore A hardness /degree | Tear strength h/KN·m⁻¹ |
|---|---|---|---|---|
| Sample 1 | 25.6 | 613 | 67 | 82 |
| Sample 2 | 26.3 | 687 | 70 | 89 |
| Sample 3 | 27.4 | 660 | 67 | 82 |
| Sample 4 | 24.5 | 648 | 63 | 77 |
| Sample 5 | 28.9 | 618 | 71 | 95 |
| Comparison 1 | 21.3 | 612 | 66 | 77 |
| Comparison 2 | 21.6 | 692 | 72 | 80 |
| Comparison 3 | 19.5 | 653 | 69 | 78 |
| Comparison 4 | 21.2 | 659 | 64 | 70 |
| Comparison 5 | 20.5 | 632 | 72 | 92 |

Figure 3

FOUNDRY DUST COMPOUND REINFORCING FILLER FOR NATURAL RUBBER AND METHOD FOR MAKING SAME

TECHNICAL FIELD

The present disclosure relates to the field of solid waste resource recovery and utilization, energy saving and environmental protection, and more particularly relates to a foundry dust compound reinforcing filler for natural rubber and a method for making same.

BACKGROUND

Natural rubber is an important industrial raw material, which is widely used in the production of tires, seals, shockproof equipment, transmission belts, etc. Natural rubber usually needs to be reinforced before it can be used. Carbon black and silica are the most important rubber reinforcing fillers. The production of carbon black and silica consumes a large amount of non-renewable disposable resources, which aggravates the problem of global resource shortage. Therefore, developing new fillers to replace or partially replace carbon black and/or silica is an effective way to solve the resource crisis.

Foundry dust is fine powdery granular waste collected by dust collection equipment in the casting workshops. The main component is silica, and also contains a small amount of oxides of aluminum, calcium, magnesium, iron, manganese, and other elements, or complex multi-component oxides formed between them. Foundry dust filler was obtained for natural rubber after acid pickling, grinding, coupling filler modification, and other processing processes in CN 106220906 B. However, the reinforcing effect of this foundry dust filler is not obvious. Foundry dust filler is a new kind of filler with different properties from traditional reinforcing filler. When the reinforcement effect of foundry dust on rubber is poor, formula workshops of rubber companies lack enough patience to conduct long-term test on their formulas, which is not conducive to the promotion and application of foundry dust reinforcement.

At the same time, since single foundry dust filler has a poor reinforcing effect on natural rubber, the reinforcing effect of foundry dust fillers is often difficult to achieve the expectations of rubber companies. Therefore, in practical application, it is often necessary to mix the foundry dust with other high performance reinforcing fillers to obtain a compound reinforcing filler that can not only utilize the foundry dust as a resource, but also reduce the amount of the high performance reinforcing fillers and has excellent reinforcing properties.

DESCRIPTION OF DRAWINGS

FIG. 3 lists mechanical properties of natural rubber composite with different recipes (Examples 1-5 and Comparisons 1-5) after vulcanization.

DETAILED DESCRIPTION

Figure 1:
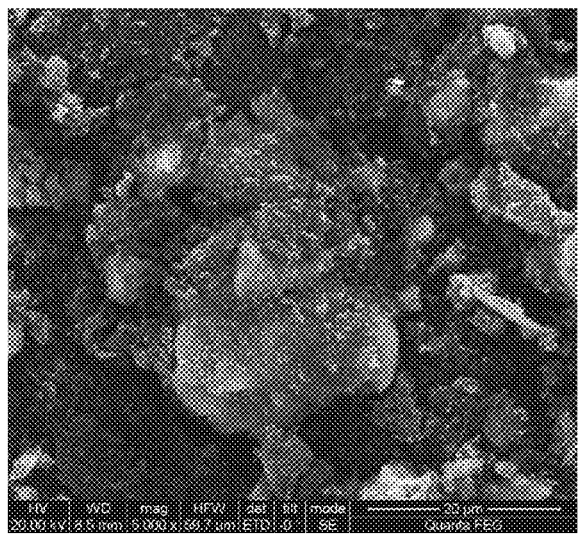
FIG. 1 shows the field emission scanning electron microscope (FE-SEM) image of foundry dust/silica/carbon black compound powder after secondary grinding in Example 5.
Figure 2:
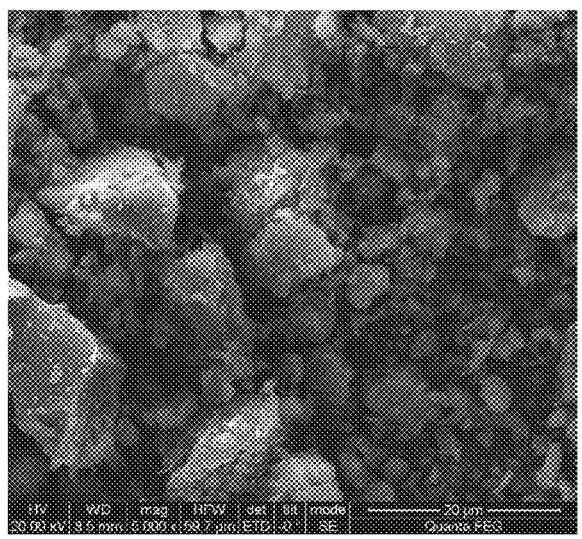
FIG. 2 shows the FE-SEM image of the original foundry dust powder before compounding.

The embodiments of the invention are described more fully hereinafter. The advantages and features of the invention can be more easily understood by those skilled in the art, so as to make a clearer definition of the protection scope of the invention.

Example 1

Screening: Screening original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating a supernatant; washing the precipitate with a large amount of deionized water to neutrality.

Primary grinding: Grinding the foundry dust after pickling using a micro pulverizer until the particle size is less than 300 mesh.

Mixing: Mixing 50 parts by weight of foundry dust with particle size less than 300 mesh, 25 parts by weight of silica (M-5), 25 parts by weight of Carbon black (VXC-72), and 1.5 parts by weight of silane coupling agent (Si-69) in a sealed mechanical mixer for 2 hours.

Secondary grinding: Grinding the compound powder mixed in the previous step in a micro pulverizer until the particle size is below 800 mesh.

Prilling: Granulating the compound powder after secondary grinding in a disc granulator to obtain a foundry dust compound reinforcing filler. Marking the foundry dust compound reinforcing filler as F50S25C25, where F represents foundry dust, S represents silica, and C represents carbon black. The numbers 50, 25, and 25 represent the mass fraction of foundry dust, silica and carbon black, respectively.

The reinforcing performance of the compound reinforcing filler is evaluated by the performance of the natural rubber composite filled with the compound reinforcing agent.

100 parts by weight of natural rubber, 2 parts by weight of stearic acid, 5 parts by weight of zinc oxide, 1 parts by weight of dibenzothiazole disulfide, 1.2 parts by weight of mercaptan based benzimidazole, 50 parts by weight of compound reinforcing filler F50S25C25, and 5 parts by weight of sulfur are successively added into the open mixer, and a mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Example 2

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 50 parts by weight of foundry dust with particle size less than 300 mesh, 30 parts by weight of silica (M-5), 20 parts by weight of Carbon black (VXC-72), and 1.5 parts by weight of silane coupling agent (Si-69) in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler, marking the foundry dust compound reinforcing filler as F50S30C20, where F represents foundry dust, S represents silica, and C represents carbon black. The numbers 50, 30, and 20 represent the mass fraction of foundry dust, silica and carbon black, respectively.

The reinforcing performance of the compound reinforcing filler is evaluated by the performance of the natural rubber composite filled with the compound reinforcing agent.

100 parts by weight of natural rubber, 2 parts by weight of stearic acid, 5 parts by weight of zinc oxide, 1 parts by weight of dibenzothiazole disulfide, 1.2 parts by weight of mercaptan based benzimidazole, 50 parts by weight of compound reinforcing filler F50S30C20, and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber compound are shown in FIG. 3.

Example 3

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 50 parts by weight of foundry dust with particle size less than 300 mesh, 20 parts by weight of silica (M-5), 30 parts by weight of Carbon black (VXC-72), and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler. Marking the foundry dust compound reinforcing filler as F50S20C30, where F represents foundry dust, S represents silica, and C represents carbon black. The numbers 50, 20, and 30 represent the mass fraction of foundry dust, silica and carbon black, respectively.

The reinforcing performance of the compound reinforcing filler is evaluated by the performance of the natural rubber composite filled with the compound reinforcing agent.

100 parts by weight of natural rubber, 2 parts by weight of stearic acid, 5 parts by weight of zinc oxide, 1 parts by weight of dibenzothiazole disulfide, 1.2 parts by weight of mercaptan based benzimidazole, 50 parts by weight of compound reinforcing filler F50S20C30, and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Example 4

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 50 parts by weight of foundry dust with particle size less than 300 mesh, 10 parts by weight of silica (M-5), 40 parts by weight of Carbon black (VXC-72), and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler. Marking the foundry dust compound reinforcing filler as F50S10C40, where F represents foundry dust, S represents silica, and C represents carbon black. The numbers 50, 10, and 40 represent the mass fraction of foundry dust, silica and carbon black, respectively.

The reinforcing performance of the compound reinforcing filler is evaluated by the performance of the natural rubber composite filled with the compound reinforcing agent.

100 parts by weight of natural rubber, 2 parts by weight of stearic acid, 5 parts by weight of zinc oxide, 1 parts by weight of dibenzothiazole disulfide, 1.2 parts by weight of mercaptan based benzimidazole, 50 parts by weight of compound reinforcing filler F50S10C40, and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Example 5

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 50 parts by weight of foundry dust with particle size less than 300 mesh, 40 parts by weight of silica (M-5), 10 parts by weight of Carbon black (VXC-72), and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler. Marking the foundry dust compound reinforcing filler as F50S40C10, where F represents foundry dust, S represents silica, and C represents carbon black. The numbers 50, 40, and 10 represent the mass fraction of foundry dust, silica and carbon black, respectively.

The reinforcing performance of the compound reinforcing filler is evaluated by the performance of the natural rubber composite filled with the compound reinforcing agent.

100 parts by weight of natural rubber, 2 parts by weight of stearic acid, 5 parts by weight of zinc oxide, 1 parts by weight of dibenzothiazole disulfide, 1.2 parts by weight of mercaptan based benzimidazole, 50 parts by weight of compound reinforcing filler F50S40C10, and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Comparison 1

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 100 parts by weight of foundry dust with particle size less than 300 mesh and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler. Marking the foundry dust compound reinforcing filler as F.

The three reinforcing agents, namely, F, silica (M-5), and carbon black (VXC-72) are sequentially added into the natural rubber and gradually mixed. Their reinforcing performance is evaluated by the performance of natural rubber composite filled with three reinforcing agents.

100 parts by weight of natural rubber, 2 parts by weight of stearic acid, 5 parts by weight of zinc oxide, 1 parts by weight of dibenzothiazole disulfide, 1.2 parts by weight of dithiolyl benzimidazole, 25 parts by weight of foundry dust reinforcing filler F, 12.5 parts by weight of silica (M-5), 12.5 parts by weight of carbon black (VXC-72), and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Comparison 2

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 1000 parts by weight of foundry dust with particle size less than 300 mesh and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcement. Marking the foundry dust reinforcement as F.

The three reinforcing agents, namely, F, silica (M-5), and carbon black (VXC-72) are sequentially added into the natural rubber and gradually mixed. Their reinforcing performance is evaluated by the performance of natural rubber composite filled with three reinforcing agents.

100 parts by weight of natural rubber, 2 parts by weight of stearic acid, 5 parts by weight of zinc oxide, 1 parts by weight of dibenzothiazole disulfide, 1.2 parts by weight of dithiolyl benzimidazole, 25 parts by weight of foundry dust reinforcing filler F, 15 parts by weight of silica (M-5), 10 parts by weight of carbon black (VXC-72), and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Comparison 3

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 1000 parts by weight of foundry dust with particle size less than 300 mesh and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcement. Marking the foundry dust reinforcement as F.

The three reinforcing agents, namely, F, silica (M-5), and carbon black (VXC-72) are sequentially added into the natural rubber and gradually mixed. Their reinforcing performance is evaluated by the performance of natural rubber composite filled with three reinforcing agents.

100 parts by weight of natural rubber, 2 parts by weight of stearic acid, 5 parts by weight of zinc oxide, 1 parts by weight of dibenzothiazole disulfide, 1.2 parts by weight of dithiolyl benzimidazole, 25 parts by weight of foundry dust reinforcing filler F, 10 parts by weight of silica (M-5), 15 parts by weight of carbon black (VXC-72), and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Comparison 4

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 1000 parts by weight of foundry dust with particle size less than 300 mesh and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcement. Marking the foundry dust reinforcement as F.

The three reinforcing agents, namely, F, silica (M-5), and carbon black (VXC-72) are sequentially added into the natural rubber and gradually mixed. Their reinforcing performance is evaluated by the performance of natural rubber composite filled with three reinforcing agents.

100 parts by weight of natural rubber, 2 parts by weight of stearic acid, 5 parts by weight of zinc oxide, 1 parts by weight of dibenzothiazole disulfide, 1.2 parts by weight of dithiolyl benzimidazole, 25 parts by weight of foundry dust reinforcing filler F, 5 parts by weight of silica (M-5), 20 parts by weight of carbon black (VXC-72), and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

Comparison 5

Screening: Screening the original foundry dust waste using an electric vibrating screen to obtain foundry dust with particle size less than 100 mesh.

De-ironing: Separating iron powder from the screened foundry dust using a dry powder magnetic separator.

Pickling: Stirring 100 parts by weight of the iron-removed foundry dust in 3000 parts by weight of 10 wt. % hydrochloric acid for 2 hours.

Precipitating: Precipitating the solid in the pickling solution after standing for 24 hours; separating the supernatant; washing the precipitate with a large amount of deionized water to neutrality.

Primary grinding: Grinding the foundry dust after pickling using a micro pulverizer until the particle size is less than 300 mesh.

Mixing: Mixing 1000 parts by weight of foundry dust with particle size less than 300 mesh and 1.5 parts by weight of silane coupling agent (Si-69) were mixed in a sealed mechanical mixer for 2 hours.

Secondary grinding: Grinding the compound powder mixed in the previous step in a micro pulverizer until the particle size reaches below 800 mesh.

Prilling: Granulating the compound powder after secondary grinding in a disc granulator to obtain a foundry dust compound reinforcing filler. Marking the foundry dust compound reinforcing filler as F.

The three reinforcing agents, namely, F, silica (M-5), and carbon black (VXC-72) are sequentially added into the natural rubber and gradually mixed. Their reinforcing performance is evaluated by the performance of natural rubber composite filled with three reinforcing fillers.

100 parts by weight of natural rubber, 2 parts by weight of stearic acid, 5 parts by weight of zinc oxide, 1 parts by weight of dibenzothiazole disulfide, 1.2 parts by weight of dithiolyl benzimidazole, 25 parts by weight of foundry dust reinforcing filler F, 20 parts by weight of silica (M-5), 5 parts by weight of carbon black (VXC-72), and 5 parts by weight of sulfur are successively added into the open mixer, and the mixed rubber is obtained by parking for 3 days after full mixing. The compound is vulcanized at 150° C. and pressure of 15 MPa for 8 min to obtain natural rubber composite.

The test values of the mechanical properties of natural rubber composite are shown in FIG. 3.

It can be seen from FIG. 3 that Examples 1-5 are samples prepared with compound reinforcing agents as fillers to natural rubber. Comparisons 1-5 are samples prepared by adding foundry dust, silica, and carbon black as fillers, respectively, to natural rubber. Among them, the mass percentage of the three fillers in Example 1 and Comparison 1 are the same; the mass percentage of the three fillers in Example 2 and Comparison 2 are the same; the mass percentage of the three fillers in Example 3 and Comparison 3 are the same; the mass percentage of the three fillers in Example 4 and Comparison 4 is the same; the mass percentage of the three fillers in Example 5 and Comparison 5 is the same. Comparing the mechanical properties of the examples and the comparisons, it can be found that when the mass percentage and the components of the reinforcing agents are the same, the tensile strength and tearing strength of the examples are significantly higher than those of the corresponding comparisons. Compared with the corresponding Comparisons, the elongation at break and the Shore A hardness of the Examples have no significant difference. Therefore, the test results of mechanical properties show that the reinforcing properties of foundry dust, silica, and carbon black ternary compound filler prepared by mechanical grinding is better than the reinforcing properties of the same mass percentage of foundry dust, silica, and carbon black when the three fillers are added to natural rubber respectively.

The preparation method of the foundry dust compound reinforcing agent is simple; the foundry dust compound reinforcing agent has obvious reinforcing effect on natural rubber, which is conducive to the rapid promotion in rubber enterprises.

The foundry dust compound reinforcing agent is formed by coating the nano carbon black and silica network structure on the surface of micron foundry dust particles by mechanical grinding method.

The foundry dust compound reinforcing agent with special structure can be added at one time when mixing with natural rubber. Compared with the step-by-step mixing method in which foundry dust, carbon black, and silica are added to natural rubber successively, the use of foundry dust compound reinforcing agent shortens the mixing cycle and reduces dust pollution.

During the mechanical grinding process of the foundry dust compound reinforcing agent, the foundry dust particles with large hardness are continuously broken and refined, and at the same time, carbon black and silica are strongly dispersed, so that carbon black and silica in the compound are easier to disperse in natural rubber during the mixing process.

The reinforcing effect of the foundry dust compound reinforcing agent on natural rubber is better than the reinforcing effect when each component with the same content is added successively in natural rubber.

The above are only the embodiments of the present invention, and do not therefore limit the scope of the present invention. All equivalent structures or equivalent process transformations made by using the content of the description and drawings of the present invention, directly or indirectly applied in other relevant technical fields, a similarly included in the patent protection scope of the invention.

What is claimed is:

1. A method for preparing a foundry dust compound reinforcing filler for natural rubber, comprising steps of:
   screening original foundry dust waste using an electric vibrating screen to obtain foundry dust with particle size less than 100 mesh;
   separating iron powder from the screened foundry dust using a dry powder magnetic separator;
   adding 100 parts by weight of the foundry dust with the iron powder removed to 3000 parts by weight of 10 wt. % hydrochloric acid and stirring for 2 hours to obtain a pickling solution;
   allowing the pickling solution to stand for 24 hours; separating a supernatant to obtain a precipitate; washing the precipitate with deionized water to neutrality to obtain a washed neutral precipitate;
   grinding the washed neutral precipitate using a micro pulverizer to obtain foundry dust with particle size less than 300 mesh;
   mixing 40-80 parts by weight of the foundry dust with the particle size less than 300 mesh, 10-40 parts by weight of silica, 10-40 parts by weight of carbon black, and 1.5 parts by weight of silane coupling agent in a sealed mechanical mixer for 2 hours to obtain a compound power;
   grinding the compound powder in a micro pulverizer until particle size of the compound powder reaches below 800 mesh;
   granulating the compound powder with particle size below 800 mesh in a disc granulator to obtain the foundry dust compound reinforcing filler.

* * * * *